(12) United States Patent
Cooper (10) Patent No.: US 6,317,827 B1
(45) Date of Patent: *Nov. 13, 2001

(54) METHOD AND APPARATUS FOR FAULT TOLERANT FLASH UPGRADING

(75) Inventor: Barnes Cooper, Aloha, OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/698,947

(22) Filed: Aug. 16, 1996

(51) Int. Cl.$^7$ ........................................... G06F 9/445
(52) U.S. Cl. ........................................................... 713/2
(58) Field of Search .................................. 395/701–978, 395/651, 652, 653; 709/310–332; 713/1, 2, 100; 711/1–221

(56) References Cited

U.S. PATENT DOCUMENTS

| | | | |
|---|---|---|---|
| 5,210,854 | * 5/1993 | Beaverton et al. | 717/11 |
| 5,361,343 | * 11/1994 | Kosonocky et al. | 365/185.11 |
| 5,388,267 | * 2/1995 | Chan et al. | 713/2 |
| 5,421,017 | * 5/1995 | Scholz et al. | 717/11 |
| 5,530,847 | * 6/1996 | Schieve et al. | 714/38 |
| 5,748,940 | * 5/1998 | Angelo et al. | 711/163 |
| 5,864,698 | * 1/1999 | Krau et al. | 713/2 |
| 5,872,967 | * 2/1999 | DeRoo et al. | 713/2 |
| 5,896,566 | * 4/1999 | Averbuch et al. | 455/419 |
| 6,009,495 | * 12/1999 | DeRoo et al. | 711/103 |
| 6,085,299 | * 7/2000 | Angelo et al. | 711/163 |

* cited by examiner

*Primary Examiner*—St. John Courtenay, III
(74) *Attorney, Agent, or Firm*—Blakely, Sokoloff, Taylor & Zafman LLP (57) ABSTRACT

A novel method for upgrading a first program sequence in a computer system such that the computer system remains operable even if the upgrade process results in an incorrectly stored program sequence. The method uses the steps of storing the second program sequence in a second region of a memory, determining whether the second program sequence is stored correctly, and enabling the second program sequence if it is stored correctly. The first program sequence remains enabled if the second program sequence is not stored correctly.

16 Claims, 5 Drawing Sheets

METHOD AND APPARATUS FOR FAULT TOLERANT FLASH UPGRADING

BACKGROUND OF THE INVENTION

1. Field of the Invention

The present invention relates to the field of computer systems; more particularly, the present invention relates to a method and apparatus for performing fault tolerant Flash electrically erasable programmable read-only memory (EEPROM) upgrading.

2. Description of Related Art

Embedded microcontrollers are increasingly used in computer systems. This is especially true for mobile computers. Microcontrollers are used for keyboard control, pointing device control, battery management, power plane control, thermal management, switch debouncing and management, and system management interfacing, for example.

When one of the devices that interacts with the microcontroller is upgraded, the firmware code that handles that interaction often needs to be upgraded. In addition, upgrades are often required when a bug is discovered in the firmware code or a work-around is required to avoid a bug in one of the devices of the computer system. Since the microcontroller typically interacts with so many elements of the computer system, including the operating system, pointing devices and battery, upgrades of the firmware code can be frequent.

Upgrades to the firmware code can be accomplished a variety of ways. For example, upgrades can be performed by providing socketed parts that are typically replaced by a service provider. Alternatively, upgrades can be performed using downloadable RAM codestores that are expensive and have high power consumption. However, the most cost-effective and convenient method is the use of Flash electrically erasable read-only memories (EEPROMs) or other Flash-based devices (e.g., a microcontroller with a Flash memory) to store the firmware code.

The use of Flash-based devices allow computer manufacturers to upgrade their computer systems using applications or basic input output system (BIOS) setup utilities that download new firmware code to a Flash memory. During the download operation, the old firmware code is erased and the new firmware code is written. A problem with this method is that the firmware code may be erased or corrupted if an error should occur during the download operation or the download operation is aborted prematurely. As a result, the computer may be rendered inoperable until it is returned to the computer manufacturer for expensive servicing.

Many techniques are employed to reduce the probability of erasure or corruption of the firmware code. Before beginning the download operation, the system verifies that there is sufficient power. A boot disk supplied by the computer manufacturer is used to ensure stable and known operating system conditions during the download operation. The power switch, reset button, and other state-changing switches are disabled to ensure continuous power and stable system conditions during the download operation. In addition, the system management interrupts and other system interrupts are disabled to reduce or eliminate interruptions of the download operation.

However, these techniques reduce the probability of erasure or corruption of the firmware code, but do not eliminate it. Despite all these precautions, portions of the firmware code can be corrupted. In addition, a disruption of power, for example, may cause the download operation to be prematurely terminated.

Therefore, it is desirable to provide a fault-tolerant upgrade process to upgrade firmware code such that the computer is still operable even if the upgrade results in erasure or corruption of the firmware code.

SUMMARY OF THE INVENTION

A fault-tolerant method and apparatus for performing a program upgrade. A first code sequence is stored in a first region of a memory and is enabled. An upgrade of the first code sequence is stored in a second region of the memory. A check is performed to determine whether the upgrade of the first code sequence is stored successfully. If the upgrade is stored successfully, the upgrade of the first code sequence is enabled. If the upgrade is not stored successfully, the first code sequence remains enabled, thereby maintaining operable code. The device therefore remains operable as the first code sequence remains enabled. Subsequent attempts at storing the upgrade of the first code sequence in the second region can then be performed until the upgrade is stored successfully.

DETAILED DESCRIPTION

The present invention uses a method for upgrading a first code sequence in a computer system such that the computer system is operable even if the upgrade process results in an incorrectly stored upgrade of the first code sequence. During the operation of the computer system, a first code sequence is stored in a first region of a memory and is enabled such that the computer system uses the first code sequence to operate. When an upgrade is to be performed, the upgrade of the first code sequence (a second code sequence) is stored in an unused region of the memory (the second region). During a reset, it is then determined whether the first and second regions contain successfully stored code sequences. If both the first and second code sequences are stored successfully, the code sequence with the more recent revision identifier (the second code sequence) is enabled. If the second code sequence is not stored correctly, the first code sequence is undisturbed and is enabled so that the computer system remains operable using the first code sequence. Subsequent attempts to upgrade the first code sequence may be made until the second code sequence is stored correctly and enabled.

An upgrade of the second code sequence (a third code sequence) is stored in the first region since the currently used region is the second region. During a reset, it is then determined whether the first and second regions contain successfully stored code sequences. If both the second and third code sequences are stored successfully, the code sequence with the more recent revision identifier (the third code sequence) is enabled. If the third code sequence is not stored correctly, the second code sequence is undisturbed and is enabled so that the computer system remains operable using the second code sequence. Subsequent attempts to upgrade the second code sequence may be made until the third code sequence is stored correctly and enabled.

Figure 1:
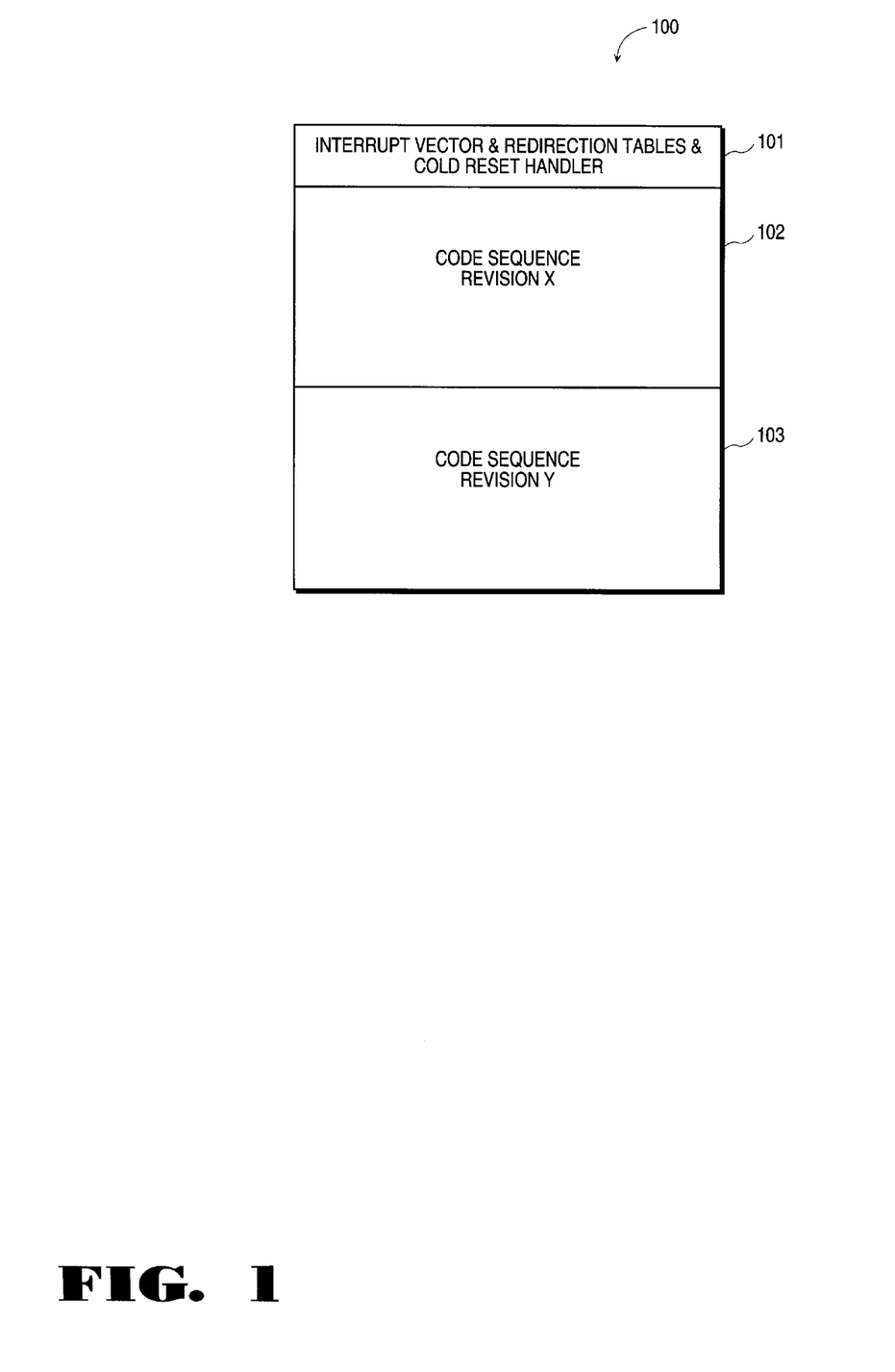
FIG. 1 illustrates one embodiment of a memory of the present invention.

FIG. 1 illustrates a memory 100 of the present invention. The memory 100 has a region 101 which contains an interrupt vector table, an interrupt redirection table, and a cold reset handler. The memory 100 also has a first region 102 in which a first code sequence is stored and a second region 103 in which a second code sequence is stored. The first code sequence and the second code sequence are different revisions of the same code.

The cold reset handler is a code sequence used to implement the method of identifying which of the first and second code sequence is to be used and enabling that code sequence as described below.

In one embodiment, the memory 100 is a Flash memory and the region 101, the first region 102, and the second region 103 correspond to independently write-protectable regions within the Flash memory. For example, the Flash memory may be configured to allow a block-erase operation and write operations within the first region 102 while preventing these operations to the second region 103 and vice-versa. In another embodiment, the region 101 is contained in a read-only memory (ROM) and the first region 102 and the second region 103 are contained in independently write-protectable regions with the Flash memory. It will be apparent to one skilled in the art that other nonvolatile memory technologies can be used. In one embodiment, the first region 102 and the second region 103 are not write-protectable. In another embodiment, the write-protection of the first region 102 and the second region 103 cannot be independently set. In other words, both regions are either write-protected or both regions are not writeprotected. In still another embodiment, the first region 102 and the second region 103 each consist of non-contiguous blocks of memory.

Figure 2:
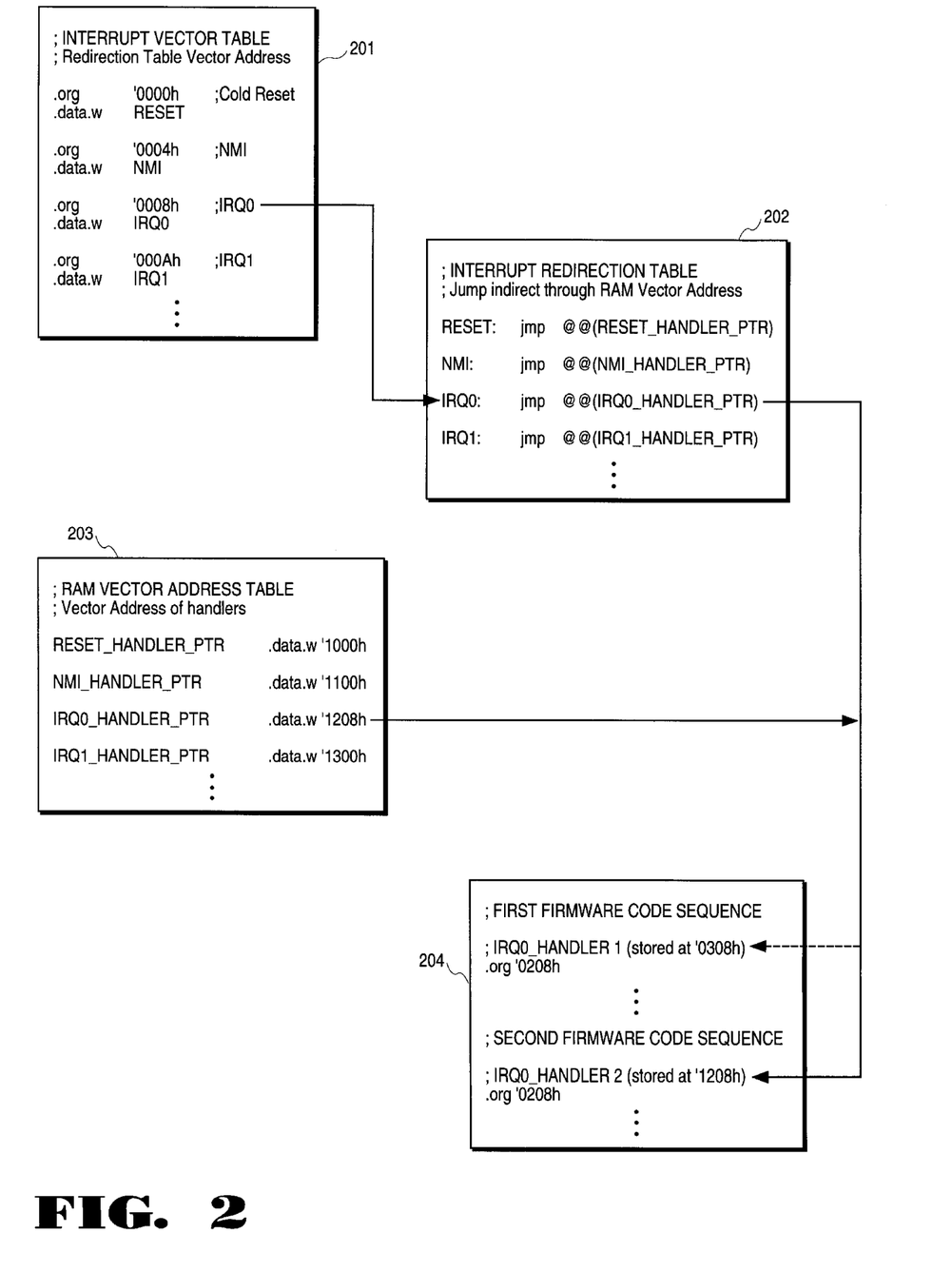
FIG. 2 illustrates one embodiment of a memory structure of the present invention.

FIG. 2 illustrates the interrelation of an interrupt vector table 201, an interrupt redirection table 202, a random access memory (RAM) vector address table 203, and the first and second code sequences. The contents of the RAM vector address table 203 can be stored in RAM rather than non-volatile memory because the contents are computed after the cold reset handler determines which of the first and second code sequences is to be enabled using the method described below. Therefore, the contents of the RAM vector address table 203 does not need to be maintained during power down. Each time the system is reset after power up, a determination of which region is to be enabled is made and the contents of the RAM vector address table 203 are computed accordingly.

The interrupt vector table 201 contains vectors corresponding to various interrupt types. Each of the vectors points to a corresponding indirect jump instruction in the interrupt redirection table 202. Each indirect jump references a corresponding address indicated in a RAM vector address table 203. Each of the addresses in the RAM vector address table correspond to an address in the corresponding interrupt handler within either the first region 102 or the second region 103, depending on whether the first or second code sequence is enabled.

For example, if an interrupt accesses the vector corresponding to IRQ0 in the interrupt vector table 201, the interrupt begins processing code at the IRQ0 address in the interrupt redirection table 202. The indirect jump at the IRQ0 address jumps to an address indicated in a corresponding location in the RAM vector address table 203. In one embodiment, the base address of the first region is 0100 h (where h indicates the value is in hexadecimal), the base address of the second region is 1000 h, and the offset of the IRQ0 handler is 0208 h. When the address in the RAM vector address table 203 contains 0308 h, the interrupt uses the interrupt handler in the first region (0100 h+0208 h). When the address in the RAM vector address table 203 contains 1208 h, the interrupt uses the interrupt handler in the second region (1000 h+0208 h).

Figure 3:
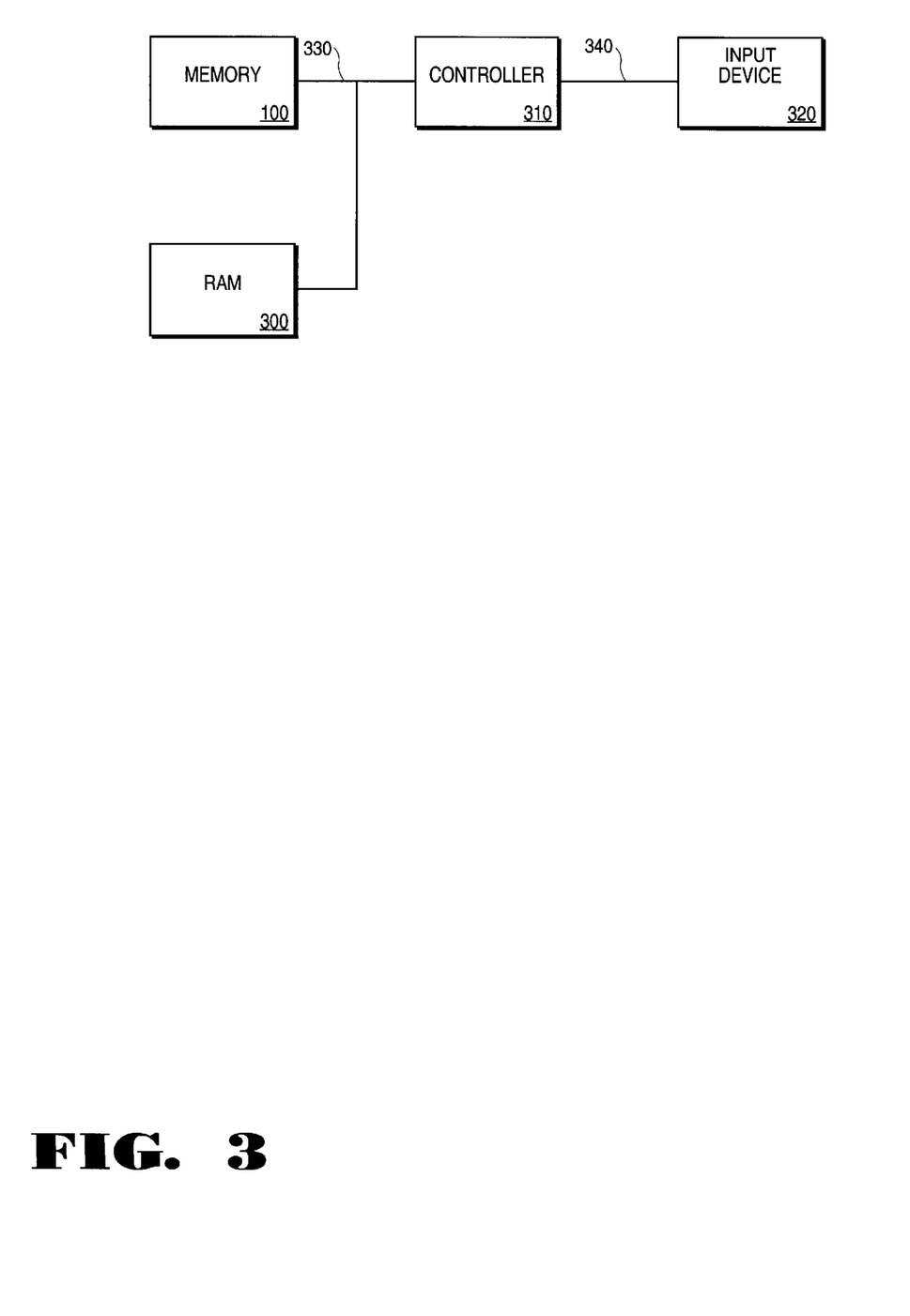
FIG. 3 illustrates one embodiment of a system of the present invention.

FIG. 3 illustrates a system of the present invention. The system comprises the memory 100 and a RAM 300 coupled to a controller 310 through a bus 330 and an input device 320 coupled to the controller through a bus 340. The memory is configured as described above. The RAM 300 is used to store the RAM vector address table as described above. The controller 310 writes and reads to the memory 100 and the RAM 300 through the bus 330 to implement the methods of the present invention. The controller accesses the input device 320 through the bus 340 to receive the code sequences to be stored in the memory 100.

It will be apparent to one skilled in the art that the controller 310 may be any device capable of controlling the upgrade of the memory 100 according to the methods of the present invention. For example, the controller 310 may be a microcontroller which is programmed to perform the methods of the present invention. Alternatively, the controller 310 may be a microprocessor capable of executing a program contained in the RAM 300, for example, to perform the methods of the present invention.

It will be apparent to one skilled in the art that the input device 320 may be any device that is capable of receiving the upgrade code sequence and providing it to the controller 310. For example, the input device may be a floppy disk subsystem for reading a floppy disk containing the upgrade code sequence. Alternatively, the input device may be a tape drive system for reading a tape containing the upgrade code sequence.

The use of an interrupt redirection table increases the latency of interrupts by the amount of time required to execute the indirect jump. For example, the increased latency would be 0.6 microseconds for a microcontroller running at 10 Mhz and using an indirect jump instruction requiring 6 clock cycles. Other methods of performing an indirect jump may be used. In one embodiment, each element in the interrupt redirection table contains a code sequence that loads a corresponding address from the RAM vector address table into a register, pushes that address onto a stack, and transfers program control to the address on the stack. For example, the increased latency of performing an indirect jump using the address on the stack would be 3.2 microseconds on a microcontroller running at 10 Mhz and using an indirect jump sequence requiring 32 clock cycles. The increased interrupt latency is insignificant for most applications. It will be apparent to one skilled in the art that the interrupt latency will depend on specific factors such as the indirect jump sequence used, the operating frequency of the controller that executes that indirect jump sequence, and the latency of the memory.

Figure 4:
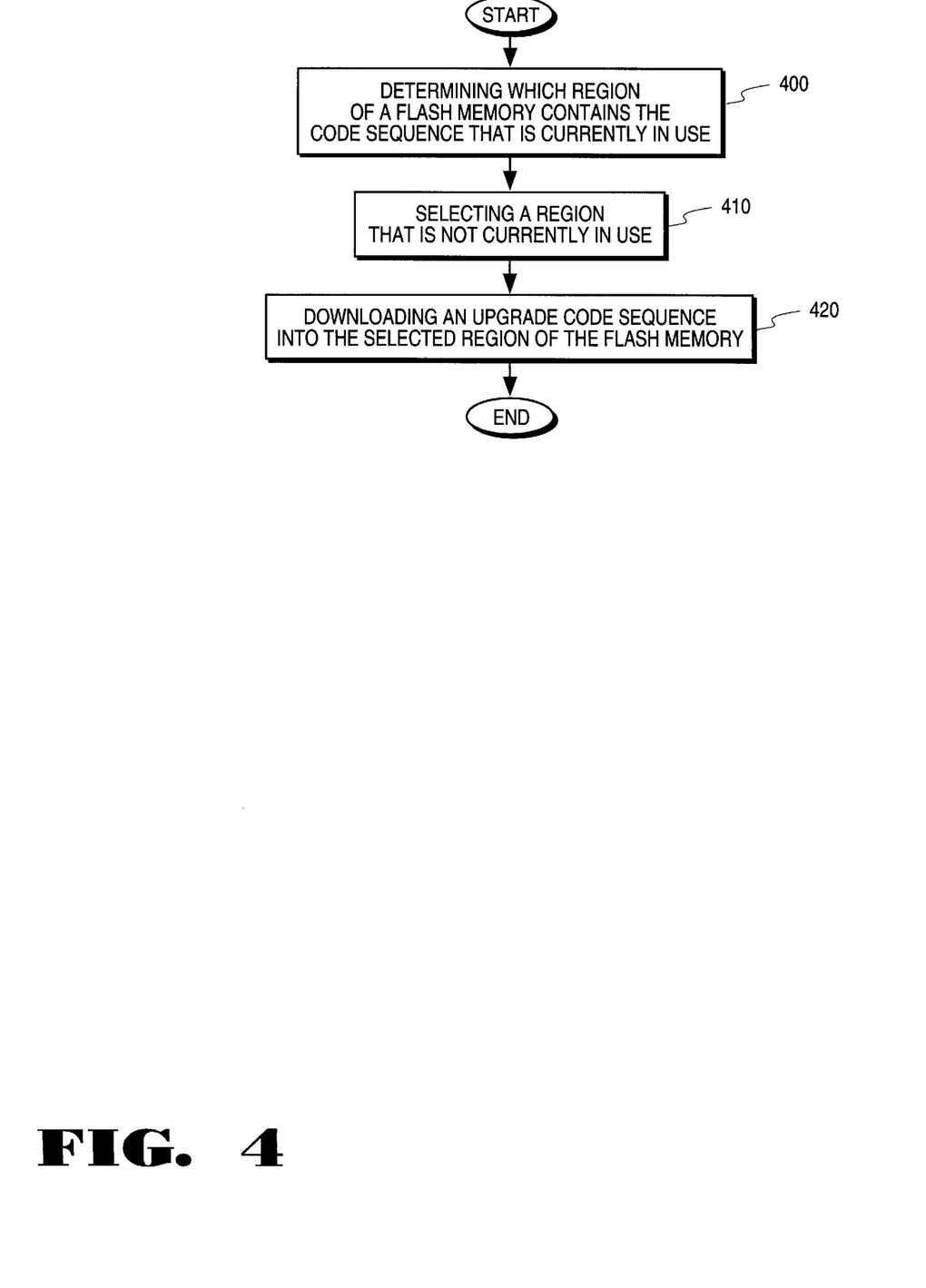
FIG. 4 illustrates one embodiment of a method for upgrading firmware code.

FIG. 4 illustrates a method for storing an upgrade to a code sequence in the memory 100. In one embodiment, the program which implements the upgrade method (upgrade program) is contained on the storage media containing the upgrade version of the code sequence. It will be apparent to one skilled in the art that the upgrade program may be stored in other nonvolatile memory for access during the upgrade process.

At step 400, the upgrade program determines whether the code sequence stored in the first region 102 (the first code sequence) or the code sequence stored in the second region 103 (the second code sequence) is currently in use to operate the computer. In one embodiment, the region in use is identified by accessing a memory containing a region-in-use identifier. In another embodiment, the region in use is identified by accessing addresses (or portions of addresses indicating the base address value) within the RAM vector address table and determining which region is pointed to by these addresses. In still another embodiment, the technique used to select the region in use during a cold reset (described below) are used to determine which region is currently in use.

At step 420, the upgrade program selects the region that contains the code sequence that is not currently in use. Should the upgrade fail, the currently used version is undisturbed in the unselected region and available for use.

In steps 410 and 420, the upgrade program determines which region is in use and then selects another region which is therefore not in use. In an alternative embodiment, the upgrade program selects regions arbitrarily or through some selection algorithm, for example, until it identifies a selected region that is not in use.

At step 430, the upgrade program writes the new version of the code sequence to the selected region.

Each time the computer system is reset during a power up (cold reset), the code sequences in the first region 102 and the second region 103 are evaluated to determine which is the latest correctly stored version and the latest correctly stored version is enabled.

Figure 5:
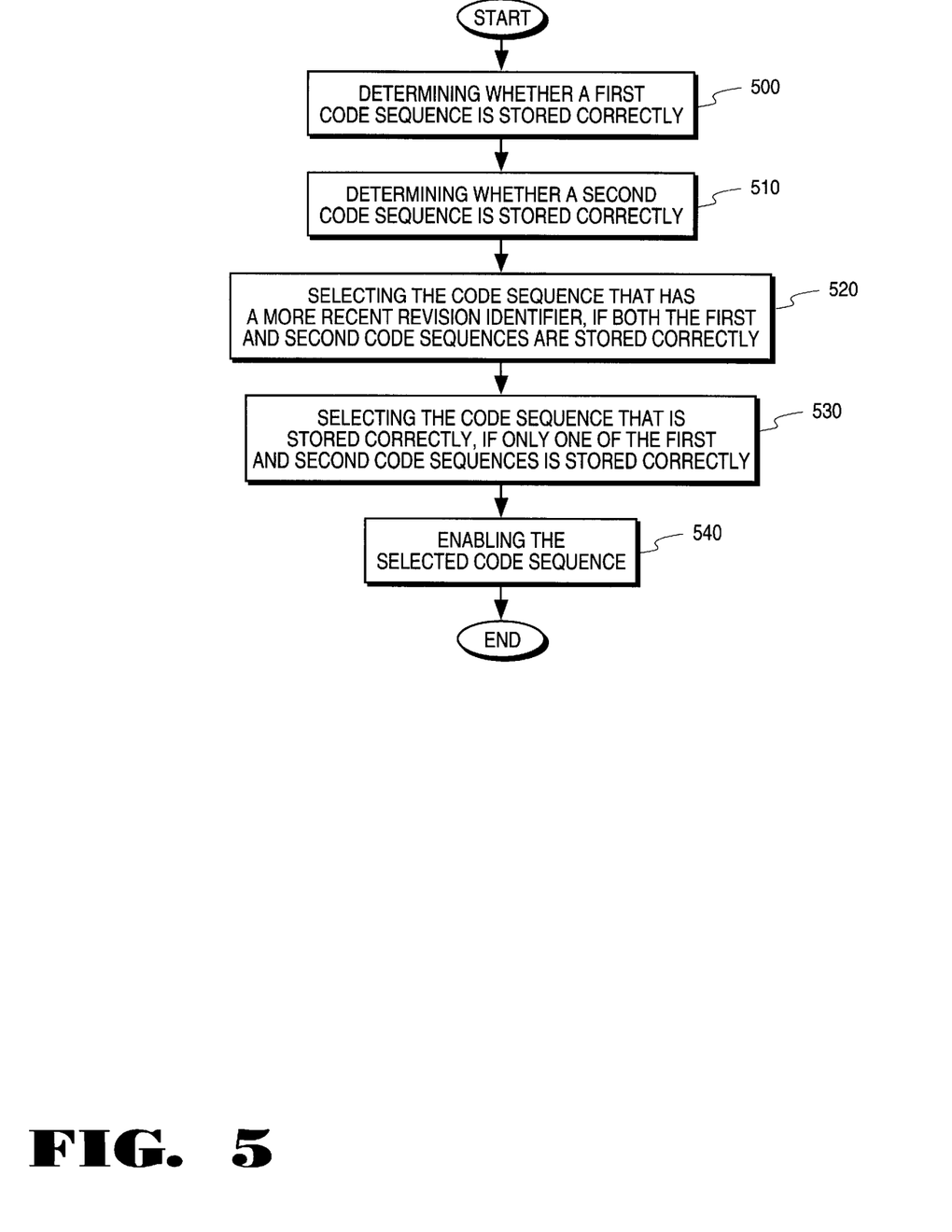
FIG. 5 illustrates one embodiment of a method for selecting the firmware code to use and enabling the firmware code.

FIG. 5 illustrates the method of enabling the latest version of the code sequence. In one embodiment, these steps are controlled by the cold reset handler. However, it will be apparent to one skilled in the art that the software sequence may be performed using a warm reset should the upgrade process be performed without powering down the computer system.

At step 500, the cold reset handler determines whether the code sequence in the first region 102 (the first code sequence) is stored correctly. In one embodiment, this is accomplished by computing a checksum of the code sequence according to well-known methods. In another embodiment, this may be accomplished by checking the parity of each element of the code sequence according to well-known methods. It will be apparent to one skilled in the art that other methods may be employed to check the integrity of the first code sequence and that multiple methods may be employed.

At step 510, the cold reset handler determines whether the code sequence in the second region 103 (the second code sequence) is stored correctly using the methods described above.

At step 520, the cold reset handler selects the code sequence that has a more recent revision identifier, if both the first and second code sequence are stored correctly. Two correctly stored code sequences are typically found when the previous version has been successfully upgraded.

At step 530, the cold reset handler selects the code sequence that is stored correctly, if only one of the first and second code sequence is stored correctly. One correctly stored code sequence is typically found when the upgrade process failed to complete successfully or when the computer system has never been upgraded. By selecting the correctly stored previous version rather than the incorrectly stored upgrade version, the system remains operable.

At step 540, the cold reset handler enables the selected code sequence. In one embodiment, the selected code sequence is enabled by storing the interrupt vectors corresponding to the selected code sequence in the RAM vector address table. These interrupt vectors are computed by adding the base address of the region containing the selected code sequence to the corresponding offsets associated with each interrupt. In one embodiment, these offsets are fixed values which are independent of the version of the code sequence. In another embodiment, these offsets may be determined by other means, such as retrieving these values from a portion of the selected code sequence. It will be apparent to one skilled in the art that any method that selectively directs execution to the selected code sequence as opposed to the other code sequences may be used to enable the selected code sequence.

The present invention increases the delay for a reset. This delay is largely due to the time required to determine whether each of the two regions contains correctly stored code. For example, the increased delay for a reset is approximately 26 milliseconds when each loop of a code sequence that sums the word elements of the two 16 K byte regions takes 16 clock cycles on a microcontroller that operates at 10 Mhz. Alternatively, the increased delay for a reset is approximately 46 milliseconds when each loop of a code sequence that sums the byte elements of the two 16 K byte regions takes 14 clock cycles on a microcontroller that operates at 10 Mhz. This is not an appreciable increased delay for a reset for most applications. It will be apparent to one skilled in the art that the increased reset delay will depend on specific factors such as the checksum code sequence used, the operating frequency of the controller that executes that checksum code sequence, and the latency of the memory.

Other embodiments of the present invention may be implemented. Whereas many alterations and modifications of the present invention will no doubt become apparent to a person of ordinary skill in the art after having read the foregoing description, it is to be understood that the particular embodiments shown and described by way of illustration are in no way intended to be considered limiting. Therefore, references to details of the preferred embodiment are not intended to limit the scope of the claims which in themselves recite only those features regarded as essential to the invention.

For example, a memory containing two regions which are capable of storing code sequences is described above. It will be apparent to one skilled in the art that the present invention may be practiced using more than two regions capable of storing code sequences. In addition, an indirect jump is used to selectively enable a code sequence in the description above. It will be apparent to one skilled in the art that other methods of selectively enabling the code sequences may be used. For example, the interrupt vector table itself may be modified to directly access the enabled code sequence. Alternatively, a direct jump instruction address may be modified to address the enabled code sequence.

Furthermore, revision identifiers are referenced to determine which of the successfully stored code sequences is the latest revision. In one embodiment, the upgrade code sequence modifies a portion of the enabled version of the code sequence such that the enabled version is no longer stored correctly after it determines that the upgrade version of the code sequence is stored successfully. The cold reset handler identifies the only successfully stored code sequence rather than compare revision identifiers to determine which code sequence to enable.

The enabled version may be modified such that it is no longer stored successfully but still able to operate correctly by modifying the checksum stored with the program, for example. During subsequent resets, the cold reset handler will determine that the previously enabled version of the code sequence is not stored correctly because the checksum no longer corresponds to the sum of the data elements of the enabled version of the code sequence. Since the rest of the code sequence (besides the checksum) is still correct, the previously enabled version of the code sequence continues to operate correctly after the upgrade program modifies the checksum. During subsequent resets, the cold reset handler will only find one correctly stored version of the code sequence, the upgrade version of the code sequence, and the upgrade version is enabled.

What is claimed is:

1. An electronic device comprising:
    a non-volatile memory, the non-volatile memory comprising:
        a first region, the first region having stored thereon a first operational version of a firmware code, and
        a second region, the second region having stored thereon a second operational version of the firmware code, the second operational version distinct from the first operational version; and
    a controller coupled to the non-volatile memory, the controller configured to (1) determine whether to enable the first or second operational version of the firmware code during a cold boot, and (2) enable only one of the first and second operational versions of the firmware during the cold boot.

2. The electronic device of claim 1, wherein the non-volatile memory is flash memory.

3. The electronic device of claim 1, wherein the non-volatile memory further comprises a third region, the third region having stored thereon a reset code sequence, the code sequence utilized by the controller to determine whether to enable the first or second operational version of the firmware code during the cold boot.

4. The electronic device of claim 1, wherein the non-volatile memory further comprises a third region, the third region having stored thereon reference addresses corresponding to a plurality of interrupt types, the reference addresses being addresses to a plurality of locations in Random Access Memory, the plurality of locations having stored therein vectors pointing to interrupt handlers contained within either the first or second region depending on whether the first or second operational version of the firmware code is enabled.

5. The electronic device of claim 1, wherein the controller determines which operational version of the software code to enable based on a revision identifier.

6. A method of booting an electronic device, the method comprising:
    receiving a cold reset signal;
    determining whether a first operational version of a firmware code was more recently stored in a first region of non-volatile memory than a second operational version of the firmware code was stored in a second region of non-volatile memory;
    in response to the cold reset signal, determining whether the first operational version of the firmware code is stored correctly;
    if the first operational version of the firmware code is stored correctly and was more recently stored than the second operational version of the firmware code, enabling the first operational version of the firmware code.

7. The method of claim 6, further comprising:
    in response to the cold reset signal, determining whether the second operational version of the firmware code is stored correctly.

8. The method of claim 6, further comprising:
    if the first operational version of the firmware code is not stored correctly, determining that the second operational version of the firmware code is stored correctly; and
    enabling the second operational version of the firmware code.

9. The method of claim 7, further comprising:
    if the first operational version of the firmware code is not stored correctly and the second operational version of the firmware code is stored correctly, enabling the second operational version of the firmware code.

10. The method of claim 6, wherein said determining whether the first operational version of firmware code is stored correctly comprises:
    computing one or more checksums for the first operational version of the firmware code; and
    determining whether each of the plurality of checksums is correct.

11. The method of claim 6, wherein the non-volatile memory is flash memory.

12. A method comprising:
    in a non-volatile memory having at least two regions, determining which region of the at least two regions contains an enabled first version of a firmware code; and
    in a region other than the one containing the enabled version of firmware code, storing a second version of the firmware code;
    performing a cold boot;
    in response to the cold boot, determining whether the second version of the firmware code is the most recently stored version of the firmware code;
    in response to the cold boot, determining whether the second version of the firmware code is stored correctly;

if the second version of the firmware code is stored correctly and is the most recently stored version of the firmware code, enabling the second version of the firmware code; and if the second version of the firmware code is not stored correctly, re-enabling the first version of the firmware code.

13. A method comprising:

storing a first version of a firmware code in a first region of a non-volatile memory and enabling the first version of the firmware code;

storing a second version of the firmware code in a second region of the non-volatile memory, wherein the first region and the second region do not overlap;

receiving a reset signal;

upon receipt of the reset signal, determining:
whether the first version and the second version of the firmware code are stored successfully, and
which of the first version and second version of the firmware code is the most recent version; and enabling the most recent version of the firmware code that is stored successfully.

14. The method of claim 13, wherein the second version of the firmware code is an upgrade of the first version of the firmware code.

15. The method of claim 14, further comprising:

if the second version of the firmware code is enabled, storing a third version of the firmware code in the first region of the non-volatile memory, wherein the third version of the firmware code is an upgrade of the second version of the firmware code.

16. The method of claim 13, wherein the non-volatile memory is flash memory.

* * * * *